May 21, 1957  L. O. CARLSEN ET AL  2,792,764
GEAR CUTTING MACHINE SPINDLE MOUNTING
Filed June 25, 1952  3 Sheets-Sheet 1
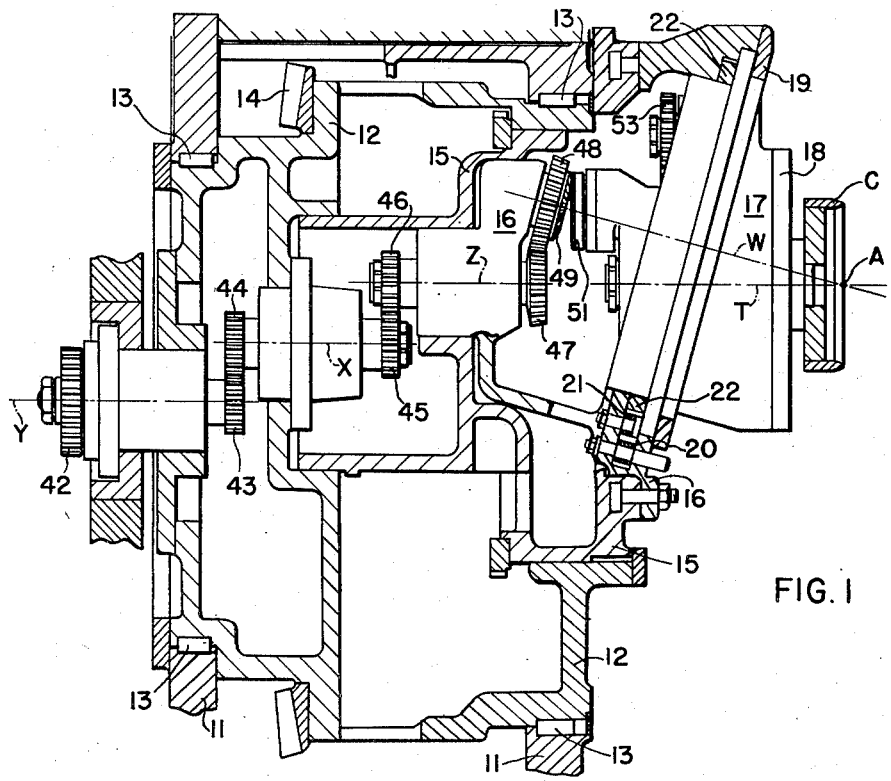
FIG. I
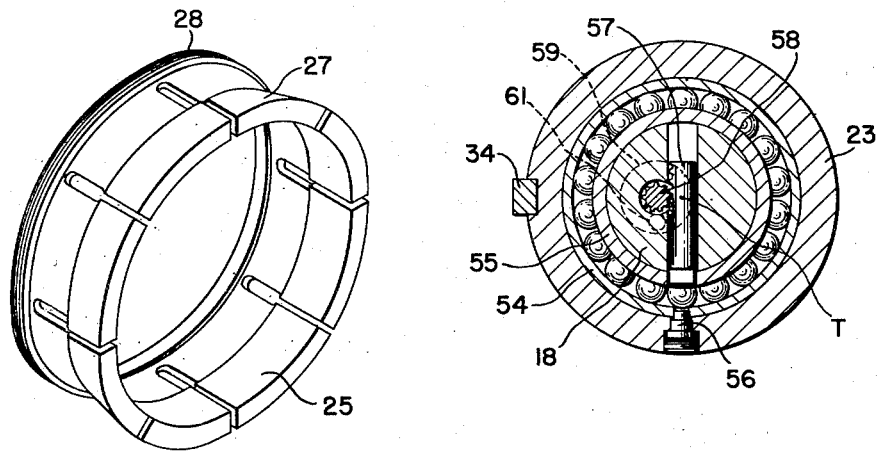
FIG. 5
FIG. 6
INVENTORS
LEONARD O. CARLSEN
HERMAN A. MALE
BY
Richard W. Treverton
ATTORNEY INVENTORS
LEONARD O. CARLSEN
HERMAN A. MALE
BY
Richard W. Treverton
ATTORNEY May 21, 1957 L. O. CARLSEN ET AL 2,792,764
GEAR CUTTING MACHINE SPINDLE MOUNTING
Filed June 25, 1952 3 Sheets-Sheet 3

INVENTORS
LEONARD O. CARLSEN
HERMAN A. MALE
BY
Richard W. Treverton
ATTORNEY

United States Patent Office 2,792,764
Patented May 21, 1957

2,792,764

GEAR CUTTING MACHINE SPINDLE MOUNTING

Leonard O. Carlsen, Rochester, and Herman A. Male, Brighton, N. Y., assignors to The Gleason Works, Rochester, N. Y., a corporation of New York Application June 25, 1952, Serial No. 295,452

6 Claims. (Cl. 90—16)

The present invention relates to a gear cutting machine and particularly to the cutter spindle mounting thereof.

In a gear cutting machine of the type employing an annular cutter it is necessary that such cutter be adjustable along its axis relative to the gear being cut in order to compensate for dimensional changes resulting from sharpening of the cutter and for other purposes. For example in the patent application of A. L. Stewart and L. O. Carlsen, Serial No. 779,890 filed October 15, 1947, now Patent No. 2,667,818, granted February 2, 1954, the cutter spindle is angularly adjustable in an oscillatory cradle about two axes which intersect the spindle axis at a common point, and it is highly desirable that the cutter be adjustable to bring its tip plane to this point. The production of high quality gears requires that such adjustment not affect the concentricity of the cutter with respect to the spindle axis, and also that after such adjustment the adjustable parts be so clamped together that the cutter will have no motion, except rotation, relative to the cradle or other spindle mounting structure.

According to the invention the cutter spindle mounting comprises a carrier member, a quill member having the spindle journaled therein, means for adjusting the members relative to each other in the direction of the spindle axis, and means including a tapered collet disposed between the members for clamping them in adjusted position. One of the members may have a conical face complementary to and engaged with the tapered face of the collet, and a ring may be screw threaded upon the collet and rotatable relative to the member with the tapered face for moving the collet relative thereto. The drive for the cutter comprises a driven gear fixed on the spindle and a drive gear rotatable on the carrier, the face widths of the gears being such that they will run in mesh in any position of axial adjustment of the quill member.

The means for adjusting the quill and carrier members relatively in the direction of the spindle axis may comprise a ring that is screw threaded upon one member and rotatable relative to the other. This ring and the ring that is screw threaded upon the collet are preferably ring gears disposed concentrically of the cutter axis, and pinions are provided for respectively rotating them, such pinions being journaled for rotation in the member upon which the ring gears rotate. The ring gears are arranged side by side and are retained against axial displacement by shoulders provided on the member upon which they rotate.

In the drawings:

Fig. 1 is an axial sectional view through the tool supporting portion of the machine;

Fig. 5 is an isometric projection of the collet for clamping the quill and carrier members; and, Fig. 6 is a detail sectional view in the plane indicated by line 6—6 of Fig. 2.

Figure 2:
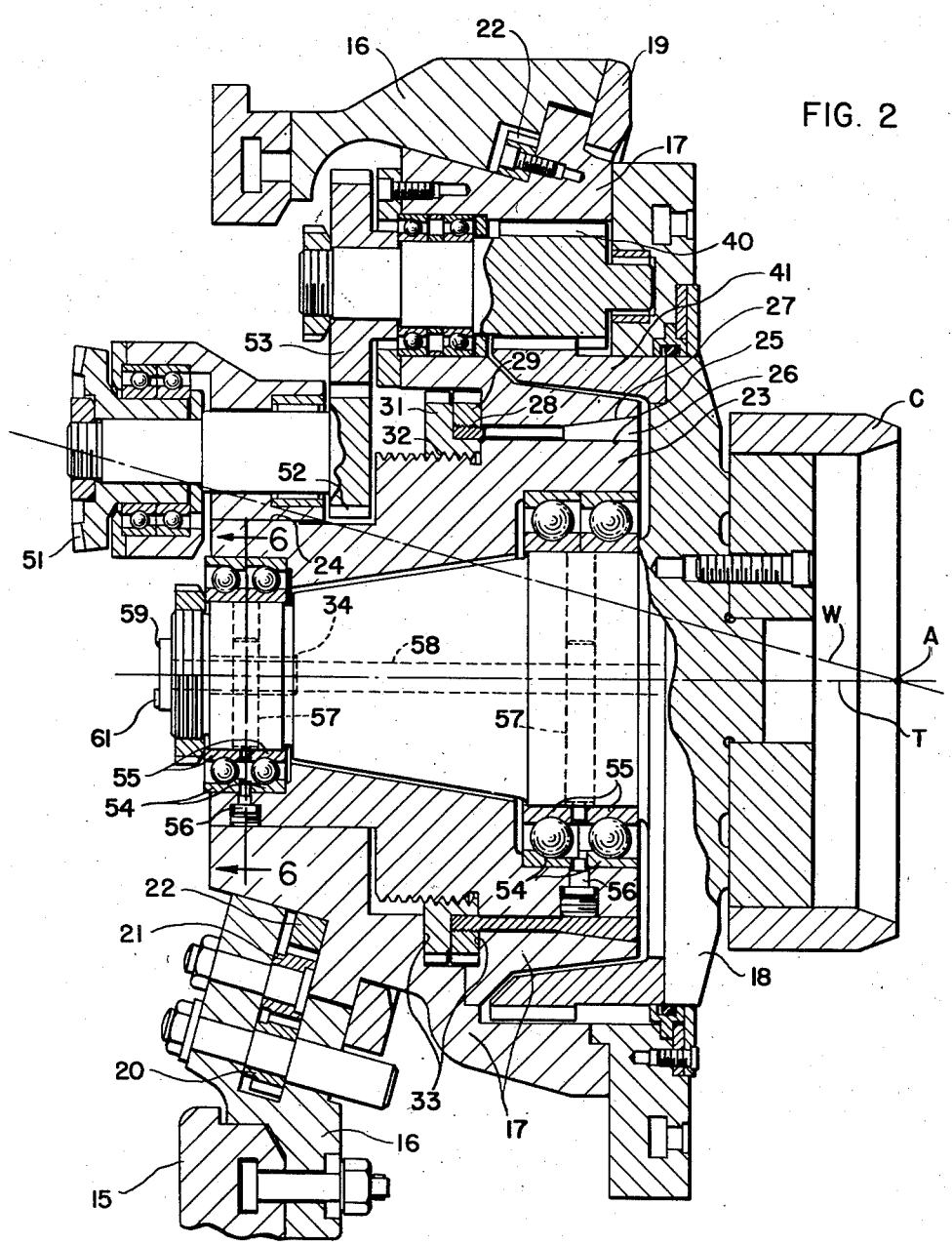
Fig. 2 is an axial sectional view on a larger scale, showing the details of the spindle and its mounting.

The invention is shown as applied to a machine of the type disclosed in the aforementioned Stewart and Carlsen patent. This machine has a base 11 in which a cradle 12 is journaled on anti-friction bearings 13 for oscillation about an axis Y, such oscillation being effected by drive means including a ring gear 14 on the cradle. A tool support 15 carried by the cradle is adjustable thereon about an axis X that is parallel to axis Y. Adjustable upon the support 15, about an axis Z that is also parallel to axis Y, is a swivel head 16, and adjustable on the latter about an axis W is a carrier 17 for the cutter spindle 18. The axis W is inclined at equal acute angles to axis T of the spindle and to axis Z, and intersects both of them at point A. Adjustment of the carrier 17 in swivel head 16 about axis W may be effected by loosening the screws that hold a gib 19 to the carrier and then turning a wrench-operated pinion 20 that meshes with an idler pinion 21, the latter in turn meshing with a ring gear 22 fixed upon the carrier. By this adjustment of the carrier, the cutter C, which is secured upon the nose of the spindle by screws, may be tilted so that its axis, T, makes any desired tilt angle with axis Z, up to and including twice the angle between axes W and T. In Figs. 1 and 2 the adjustment is such that this tilt angle is 0°, the axes Z and T being coincident. By adjusting the swivel head 16 in support 15 about axis Z the plane of the tilt angle, i. e. the plane containing axes T and Z, may be adjusted about the latter axis, and by adjusting the support 15 in cradle 12 about axis X the radial distance of point A from cradle axis Y may be varied. Also upon disengaging certain elements (not shown) in the drive train to ring gear 14, the cradle may be adjusted about its axis Y to vary its position, at the mean point of its oscillation, relative to the frame 11.

The annular gear cutter C may be either a bladed tool or an abrasive wheel. In any case it is highly desirable, to facilitate predetermination of the machine adjustments necessary for cutting a particular gear, that the tip plane of the cutter always be brought to point A after the cutter has been resharpened or replaced. By the present invention such adjustment is made possible by journaling the spindle 18 in a quill 23 which is adjustable, in a direction axially of spindle 18, upon a cylindrical bearing surface 24 of carrier 17 and a cylindrical inner bearing surface 25 on the split end of a collet 26 (Fig. 5). The outer surface 27 of the split end of the collet is of tapering or conical formation and engages a complementary conical surface of the carrier 17. The opposite end of the collet is exteriorly screw threaded, as shown at 28, to a ring gear 29, which, like the collet, is concentric with axis T. Another concentric ring gear, 31, is screw threaded to the quill 23, as shown at 32. Shoulders 33 of the carrier hold gears 29 and 31 against axial motion, the carrier being made in two parts to enable assembly of the gears between the shoulders. The quill is held against rotation by a key 34 engaging in a keyway in the carrier.

Figure 3:
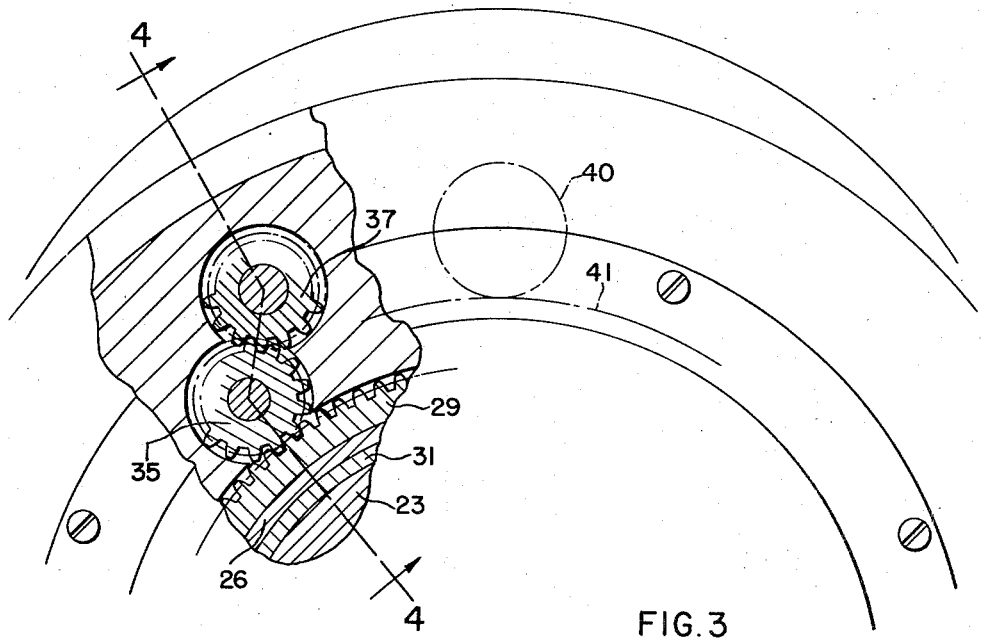
Fig. 3 is a fragmentary view in a plane, 3—3 in Fig. 4, transaxial of the spindle, showing the pinion means for rotating one ring gear.
Figure 4:
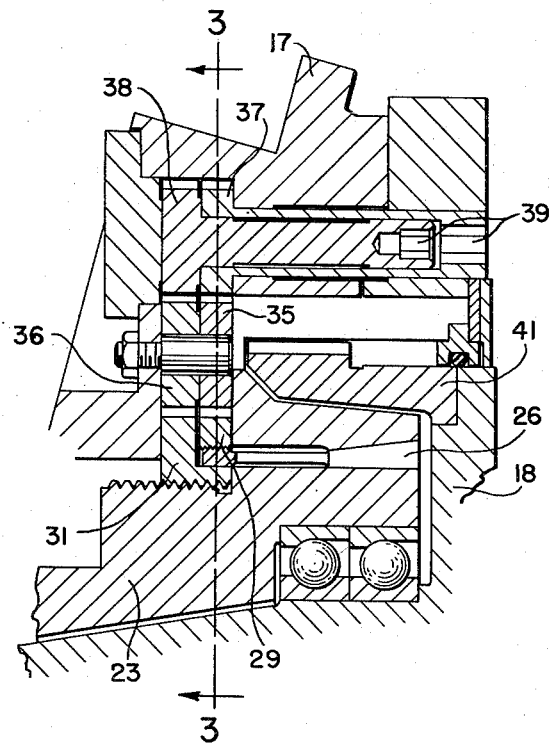
Fig. 4 is a detail sectional view taken in the plane indicated by line 4—4 of Fig. 3.

As shown in Figs. 3 and 4, idler pinions 35 and 36 are mounted on a stud shaft affixed to the carrier 17 and mesh respectively with the ring gears 29 and 31, and also mesh respectively with coaxial pinions 37 and 38. The shank of pinion 37 is journaled in carrier 17 and has a wrench socket accessible from the front of the cradle assembly, while the shank of pinion 38 is telescoped within pinion 37 and has a wrench socket similarly accessible. Both of these wrench sockets are designated 39. To effect adjustment of the cutter along axis T to bring its tip plane to point A, the pinion 37 is first turned to rotate the ring gear 29 in such direction that screw threads 28 cause collet 26 to advance (to the right in Figs. 2 and 4), thereby freeing the quill 23 for axial adjustment. This adjustment is then effected by rotating pinion 38, which causes ring gear 31 to rotate and act through the screw threads 32 to move the quill axially in the carrier. After this adjustment the pinion 37 is rotated in the opposite direction, so that gear 29 draws the collet to the left in Figs. 2 and 4, wedging the tapered surfaces to contract the split end of the collet and thereby firmly clamp the quill to the carrier.

Rotation of the cutter during operation of the machine is effected through a drive pinion 40 meshing with a driven gear 41 that is fixed on the spindle. The face widths of these gears are such that they remain in drive relationship in any position of adjustment of the quill. Pinion 40 is journaled for rotation in the carrier 17 and is driven through a gear train comprising gears 42 and 43 rotatable in the cradle on axis Y, gears 44 and 45 also rotatable in the cradle, on axis X, gears 46 and 47 rotatable in swivel head 16 on axis Z, gears 48 and 49 rotatable in head 16, on an axis inclined to axis Z at the same angle axes W and T are relatively inclined, gear 51 and pinion 52 rotatable in carrier 17, and gear 53 on the shank of pinion 40.

The spindle is journaled in quill 23 in front and rear ball bearing units each of which has outer annular races 54 fitted in bores in the quill and inner annular races 55 fitted on the spindle. The bearing units are retained, under an axial preload, in assembly with the quill and the spindle by a shoulder at the outer end of the spindle and a nut threaded on the inner end of the spindle, as shown. In order to prevent rotation of the bearing races relative to their respective supporting parts 23 and 18, they are interlocked to the latter by keying means. These means comprise pins 56 that have their inner ends squared to engage in the radial keyways in the inner end faces of the races 54 and that are locked in the quill by clamp screws as shown. The keying means further comprise keys 57 engaging in radial keyways in the inner end faces of races 55. Each key 57 is slidable in a diametral bore through the spindle and is provided with rack teeth meshing with pinion teeth cut in a shaft 58 which is rotatable in the spindle eccentrically of axis T. The keys 57 may be shifted axially to engage in the keyways in races 55, or to withdraw therefrom, by turning shaft 58 with a suitable wrench engaged with a head 59 on the end of the shaft, after first removing a screw 61 which holds the shaft against rotation in the spindle when the machine is assembled. The spindle assembly, including the key means for holding the bearing races against rotative creeping are described and claimed in our divisional application Serial No. 449,208, filed August 11, 1954.

Having now described a preferred embodiment of our invention what we claim is:

1. A gear cutting machine having an oscillatable cradle carrying a tool support, a swivel head angularly adjustable on the support about an axis parallel to that about which the cradle is oscillatable, a carrier adjustable angularly on the swivel head, a quill carried by the head and a cutter spindle journaled therein and adapted to support an annular cutter, the axis about which the carrier is adjustable intersecting at the same point and at equal acute angles the spindle axis and the axis about which the swivel head is adjustable, the quill being slidably adjustable in the carrier in the directions of the spindle axis, for bringing the tip plane of the cutter to said point of intersection, by a ring gear screw threaded upon the quill and rotatable on the carrier in concentricity with the spindle axis, means to clamp the quill to the carrier comprising an annular tapered collet disposed between the carrier and the quill and movable axially of the spindle by a ring a gear screw threaded upon the collet and rotatable upon the carrier in concentricity with the spindle axis, and pinions journaled in the carrier respectively meshing with the ring gears for rotating them.

2. A gear cutting machine having an oscillatable cradle carrying a tool support, a swivel head angularly adjustable on the support about an axis parallel to that about which the cradle is oscillatable, a carrier adjustable angularly on the swivel head, a quill carried by the head and a cutter spindle journaled therein and adapted to support an annular cutter, the axis about which the carrier is adjustable intersecting at the same point and at equal acute angles the spindle axis and the axis about which the swivel head is adjustable, the quill being slidable axially in the carrier in the direction of the cutter axis, and means for effecting adjustment of the quill in said direction for bringing the tip of the cutter to said point of intersection.

3. A gear cutting machine having an oscillatable cradle carrying a tool support, a swivel head angularly adjustable on the support about an axis parallel to that about which the cradle is oscillatable, a carrier member adjustable angularly on the swivel head, a quill member carried by the head and a cutter spindle journaled therein and adapted to support an annular cutter, the axis about which the carrier is adjustable intersecting the cutter spindle axis, means for adjusting said members relative to each other in the direction of the cutter axis, to thereby adjust the cutter with respect to the axis intersection point, a tapered collet disposed between said members for clamping them in adjusted position, one of said members having a conical face complementary to and engaged with the tapered face of the collet, and means acting between one of said members and the collet for effecting axial movement of the latter.

4. A gear cutting machine according to claim 3 in which the last-mentioned means comprises a ring screw threaded upon the collet and rotatable relative to said one of said members for moving the collet relative thereto.

5. A gear cutting machine comprising a carrier member, a quill member having a cutter spindle journaled therein, said members being adjustably movable relative to each other in the direction of the cutter axis, a tapered collet disposed between said members for clamping them in adjusted position, one of said members having a conical face complementary to and engaged with the tapered face of the collet, and a ring gear screw-threaded upon the collet and rotatable relative to said one of said members for moving the collet relative thereto, a ring gear screw-threaded upon the other one of said members and rotatable relative to said one of said members for effecting the adjustment of said members in the direction of the cutter axis, said ring gears being disposed concentrically of the cutter axis, and pinions journaled for rotation in said one of said members for respectively rotating said gears.

6. A gear cutting machine according to claim 5 in which the gears are rotatable relative to the carrier member and the latter has shoulders retaining the gears against axial displacement.

References Cited in the file of this patent

UNITED STATES PATENTS

| Re. 17,838 | Gayman | Oct. 21, 1930 |
| 847,541 | Ayers | Mar. 19, 1907 |
| 876,836 | Plimpton | Jan. 14, 1908 |
| 1,255,378 | Beach | Feb. 5, 1918 |
| 2,153,424 | MacRae | Apr. 4, 1939 |
| 2,167,189 | Verderber | July 25, 1939 |
| 2,192,856 | Nenninger | Mar. 5, 1940 |
| 2,239,567 | Nenninger | Apr. 22, 1941 |
| 2,283,154 | Koch | May 12, 1942 |
| 2,293,880 | Armitage et al. | Aug. 25, 1942 |
| 2,374,919 | Bruseth | May 1, 1945 |
| 2,443,518 | Ljunggren | Dec. 30, 1947 |
| 2,511,675 | Monpain | June 13, 1950 |
| 2,629,293 | Eserkaln | Feb. 24, 1953 |

FOREIGN PATENTS

| 2,381 | Great Britain | Feb. 1, 1896 |